(12) United States Patent  
Camlibel et al.

(10) Patent No.: US 6,674,947 B2
(45) Date of Patent: Jan. 6, 2004

(54) HIGH DENSITY, ANGLED OPTICAL FIBER ARRAY AND METHOD

(75) Inventors: Irfan Camlibel, Bedminster, NJ (US); Jonathan Sherman, Caldwell, ID (US); Theodore C. Rich, Basking Ridge, NJ (US); Ernest J. Rich, Princeton, NJ (US)

(73) Assignee: Fiberguide Industries, Inc., Stirling, NJ (US)

( * ) Notice: Subject to any disclaimer, the term of this patent is extended or adjusted under 35 U.S.C. 154(b) by 365 days.

(21) Appl. No.: 09/792,423

(22) Filed: Feb. 23, 2001

(65) Prior Publication Data

US 2002/0118930 A1 Aug. 29, 2002

(51) Int. Cl.[7] .............................. G02B 6/04; G02B 6/40
(52) U.S. Cl. .......................... 385/115; 385/120; 385/85
(58) Field of Search .............................. 385/115, 116, 385/120, 85, 80, 77, 88, 89; 451/28, 29, 41–44

(56) References Cited

U.S. PATENT DOCUMENTS 5,907,650 A * 5/1999 Sherman et al. ............... 385/80
6,102,777 A * 8/2000 Duescher et al. ............. 451/36
6,393,187 B1 * 5/2002 Engelberth et al. ......... 385/115

* cited by examiner

Primary Examiner—Rodney Bovernick
Assistant Examiner—Juliana K. Kang
(74) Attorney, Agent, or Firm—Edward Dreyfus, Esq.

(57) ABSTRACT

A system of making high density optical fiber arrays that includes securing the optical fiber ends in the housing front mask openings, then lapping the fiber ends and front mask forward surface to angle the fiber end front surfaces so that reflected wave energy does not interfere with optical signal data when transmitted during use. The opening pattern is preferably 2×2 to 128×128 or higher. Several alternate lap tool designs are disclosed including translational and rotating laps formed from solid bodies or a series of stacked plates. Standard slurry grinding and polishing compounds can be applied as desired. If a layer of epoxy originally covers the mask front face, it is removed by the lap tool as the fiber ends are lapped.

28 Claims, 4 Drawing Sheets

HIGH DENSITY, ANGLED OPTICAL FIBER ARRAY AND METHOD

BACKGROUND

The present invention relates to optical fiber arrays and to apparatus and methods of grinding and polishing the face of each fiber in the array.

Advancements have been made in recent years in the art of design and manufacture of optical fiber arrays. Early optical couplers or connectors included between two to eight optical fibers secured in a single dimension or line of fiber ends by the body of the connector or coupler. The free face of each optical fiber could easily be ground and polished with use of standard equipment. Advancements led to two-dimensional arrays in which the fibers were secured in rows and columns, initially 4×4 and 8×8. Here to, the fiber faces were ground and polished by conventional apparatus, usually prior to insertion into the coupling array device.

The need in the telecommunications industry, however, is for arrays with much greater fiber positioning precision and far greater fiber density. Innovations such as disclosed in U.S. patent application Ser. No. 09/618,179 filed Jul. 18, 2000 contributed to achieving arrays with 19×19, 64×64, 128×128 fibers, and potentially higher fiber number arrays. Because of the physical requirements for arrays in the field, the packing density of these large numbers of fibers into an array has increased greatly thus creating technical problems in grinding and polishing tiny and closely packed optical fiber faces. These problems are made more complex by the desire to grind each fiber face at the same 8° or other suitable angle to the normal of the respective fiber core axis. This angled face functions to prevent reflected optical energy (waves) from distorting the data content of the optical energy, which arises from a face ground perpendicular to the core axis.

SUMMARY OF EXEMPLARY EMBODIMENTS OF THE PRESENT INVENTION

An objective of the present invention is to provide an apparatus and method for polishing and/or grinding optical fiber ends in an array that solves the foregoing problems and provides other benefits and features some of which are described below.

Another objective is to grind and polish the face of each fiber in a high-density array at an angle (such as 8 degrees) from the plane perpendicular to the optical axis of the array, or other angle that may be desired. The purpose for preparing such an array includes reducing the back reflections from the fiber face when light is injected into the fiber from an optical element, such as a diode laser or any other device, in which back reflections can cause interference with the operation of that element.

One exemplary embodiment according to the principles of the present invention includes using an integral lapping tool (the lap) in which the surface of the lap has a saw tooth cross-section. The lap face can be composed of rows of tilted planes running parallel to each other on the lap surface. Each of these planes is tilted at the required angle to produce the desired angle on the fiber ends after polishing of the array end face. The spacing or pitch of the rows of these tilted planes match the pitch of the rows of the fibers in the array to be polished. The forward face of the array includes a layer of epoxy in which the fiber tips are embedded. The lap tool grinds the epoxy surface to form an angled surface in the epoxy as well as the fiber tips.

An alternate embodiment includes a series of thin plates with edges preground at the required angle, e.g., 8 degrees. These plates are stacked together giving a lap with the same type surface as above. That is, the face of this lap would have some rows of parallel planes tilted at 8 degrees and spaced a precise distance apart matching the pitch of the array.

In each of the above examples, the lap would be aligned with its tilted planes parallel to the rows of fibers in the fiber array. The lap would be moved across the face of the stationary array to be polished using a reciprocating lap motion. Alternatively, the face of the array could be drawn across the stationary lap using a reciprocating array motion.

As the lap is moved across the face of the array, or vice versa, a grinding and/or polishing compound, typically suspended in a carrying liquid, such as water, is introduced between the lap and the array face. Such grounding and polishing compounds can be typical of those commonly used in the optical grinding and polishing industry.

Another embodiment includes circular plates or disks each having its edge ground at the required angle from the vertical. The disks are stacked together to form a rotating plate assembly or tool bit. These circular lapping plates, preferably, with a diameter much greater than the individual fiber core diameter, can be rotated by a drive motor and, while rotating, simply drawn across the face of the fiber array that is to be ground and polished. The motion of the tool in this case would not be reciprocating but rotating in one angular direction, however, multiple translational passes across the multiple rows of fibers are required to achieve desired results. As before, a grinding or polishing compound, usually suspended in an appropriate medium such as water, kerosene, or other fluid would be introduced between rotating plates and the face of the array. Advantages of this system include (i) easier access of the grinding and polishing slurry to the space between lap surface and the surface of the array and fibers during grinding and polishing, and (ii) rotation of the tool tends to carry fresh slurry to the grinding/polishing surface and carry away the ground debris.

Yet a further variation of the lap includes plates with ground edges to give a truncated saw tooth cross-section rather that a pointed tooth cross-section. In the case of the integral lap, this would be accomplished by simply preparing the lap so that the rows have the desired truncated saw tooth profile. In the other case, the flat elements of the stacked plate lap or the circular stacked plates, each plate could have its edge modified by grinding its face with the desired profile or by making thinner plates with the full saw tooth edge and interleaving them in stacking with plates that have a vertical edge but have a smaller width or smaller diameter than the angled edge plates. In either case, the lapping tool can be formed by machining from a single piece of suitable material such as brass, steel, etc. in a lathe or NCM tooling unit. One advantage to this approach would be that no alignment constraints would be required as in stacking the layers of individual plates as mentioned above. Polishing efficiency and quality can be enhanced by vertically dithering the tool during rotation.

It will be understood that the number of plates could equal the number of rows (or columns) of the array or could be less than the number of rows (or columns). In the latter case, the rotating or reciprocating tool could be controlled in an indexed step-and-repeat method to grind one or more rows or columns at a time, then index to the next row or set of rows, and repeat until all rows or columns are ground or polished.

As mentioned above, the back reflections would cause interference with the device operation where the device is either launching light into the fiber in the array or accepting light from that fiber. Although similar results have been reported to be obtained by putting anti-reflection (AR) coatings on the ends of fibers, it has proven to be quite difficult to obtain a uniform coating across the full array of fibers. Although AR coating also reduces losses due to reflections, the effects due to interference and non-uniformity of the coating across the face of full array far outweigh the use of AR coatings. In contrast, the uniformity of effective back reflection across the end faces of a fiber array can be controlled very well by the grinding and polishing techniques according to the principles of the present invention.

DRAWING DESCRIPTION

Other and further objects and features of the present invention will become apparent with the following detailed description when taken in view of the appended drawings in which:

It will be understood that the subject matter of the drawings is conceptual and purposely not drawn to scale in order to clearly show the concepts according to the present invention. Also, the number of grinding/polishing surfaces and the number of filler rows and columns in the drawings have been greatly reduced from actual arrays mentioned above.

DETAILED DESCRIPTION OF EXEMPLARY EMBODIMENTS OF THE INVENTIONS

Figure 1A:
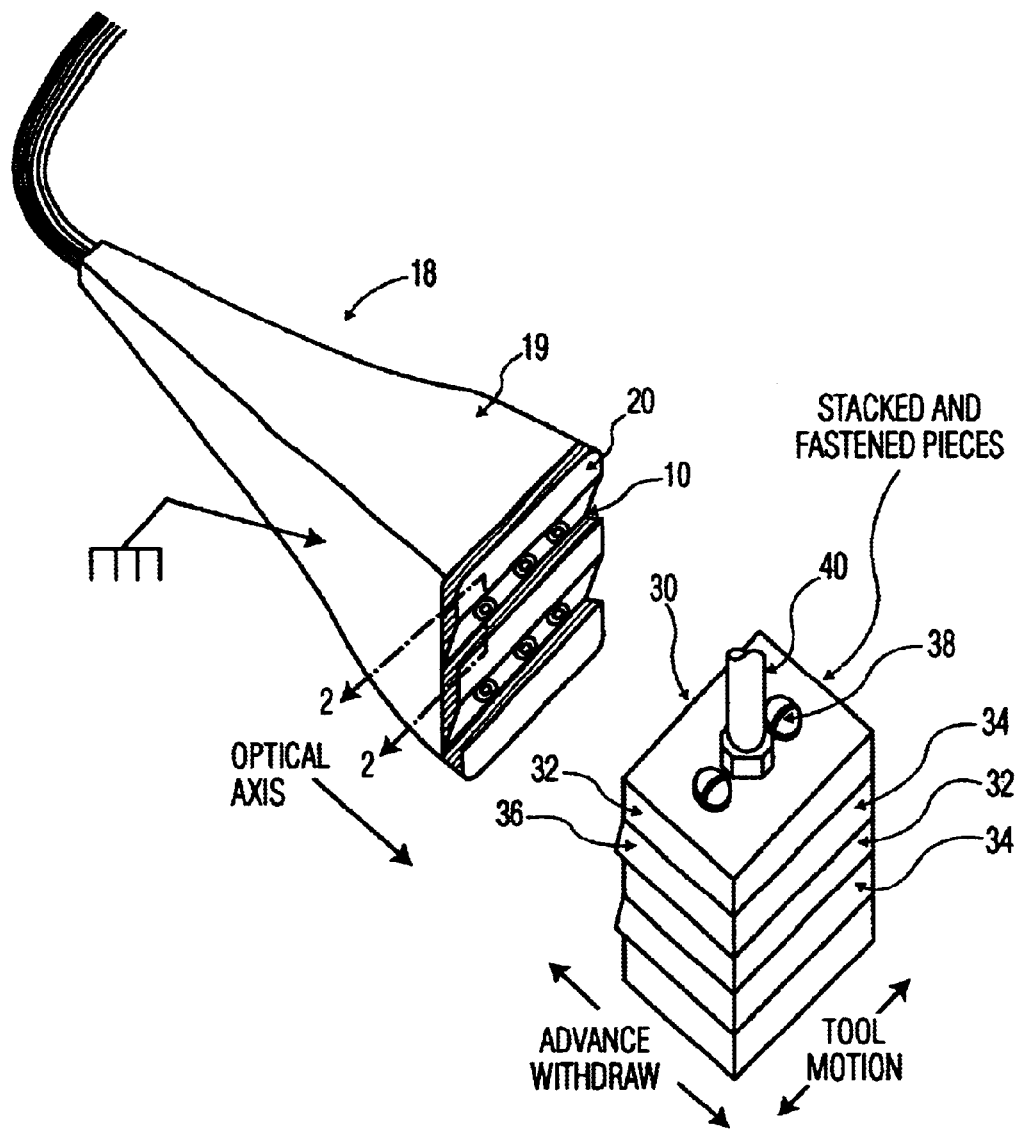
FIG. 1A is a perspective view of one exemplary embodiment according to the principles of the present invention that shows a fiber optic 2×2 array and one example of a lap after the forward epoxy and angled surfaces had been ground and polished.
Figure 1B:
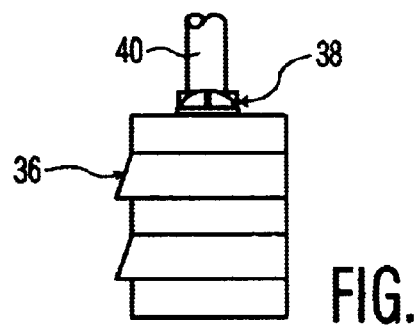
FIG. 1B is a side view of the lap tool of FIG. 1A.

With reference to FIGS. 1A, B and 2 an optical fiber array 18 includes a housing 19 and a front mask 20 forming a series of openings arranged in rows and columns, such as 8×8, 64×64 or higher. A guide plate and strength member 22 is located at the rear face of mask 20 in order to resist the grinding/polishing forces applied by the lap.

The distal ends of a like plurality of fibers 10 include cores 14 and cladding 12 preferably, but not necessarily, had shaped with a distal conical tip. Fiber 10 is inserted through the member 22 opening until the conical surface bottoms on the walls of the mask opening, generally as shown, with the core extending forward of the mask 20 front face. A layer of epoxy 21 is applied to the front mask 20 face to secure and protect the fiber tip to the mask and fill voids. See U.S. Pat. No. 5,907,650 issued May 25, 1999 for more detail on a preferred method of fiber preparation and securement. It will be understood that alternate securement methods and fiber tip configurations can be used without departing from the principles of the present invention.

One example of the lap tool includes lap 30 that can be formed by a series of stacked grinding or polishing plates 32 and 34. Plates 34 can be made of standard grinding tool material such as bronze, copper, stainless steel, etc. preloaded with grinding material such as diamond of selected grit size by electroplating or similar techniques commonly utilized in that industry. Each plate has a grinding surface 36 sloping, in this example, downward and forward the desired angle A. Surface 36 extends laterally at least sufficiently to engage a portion of all fiber tips in mask 20 during grinding or polishing. Plates 32 function as spacers to assure surfaces 36 align with the rows of fibers 10 in mask 20. The stack of plates can be held together by bolts 38 and the tool can be advanced to, withdrawn from, and moved rapidly in the transverse direction by drive shaft 40.

METHOD OF OPERATION

Figure 2:
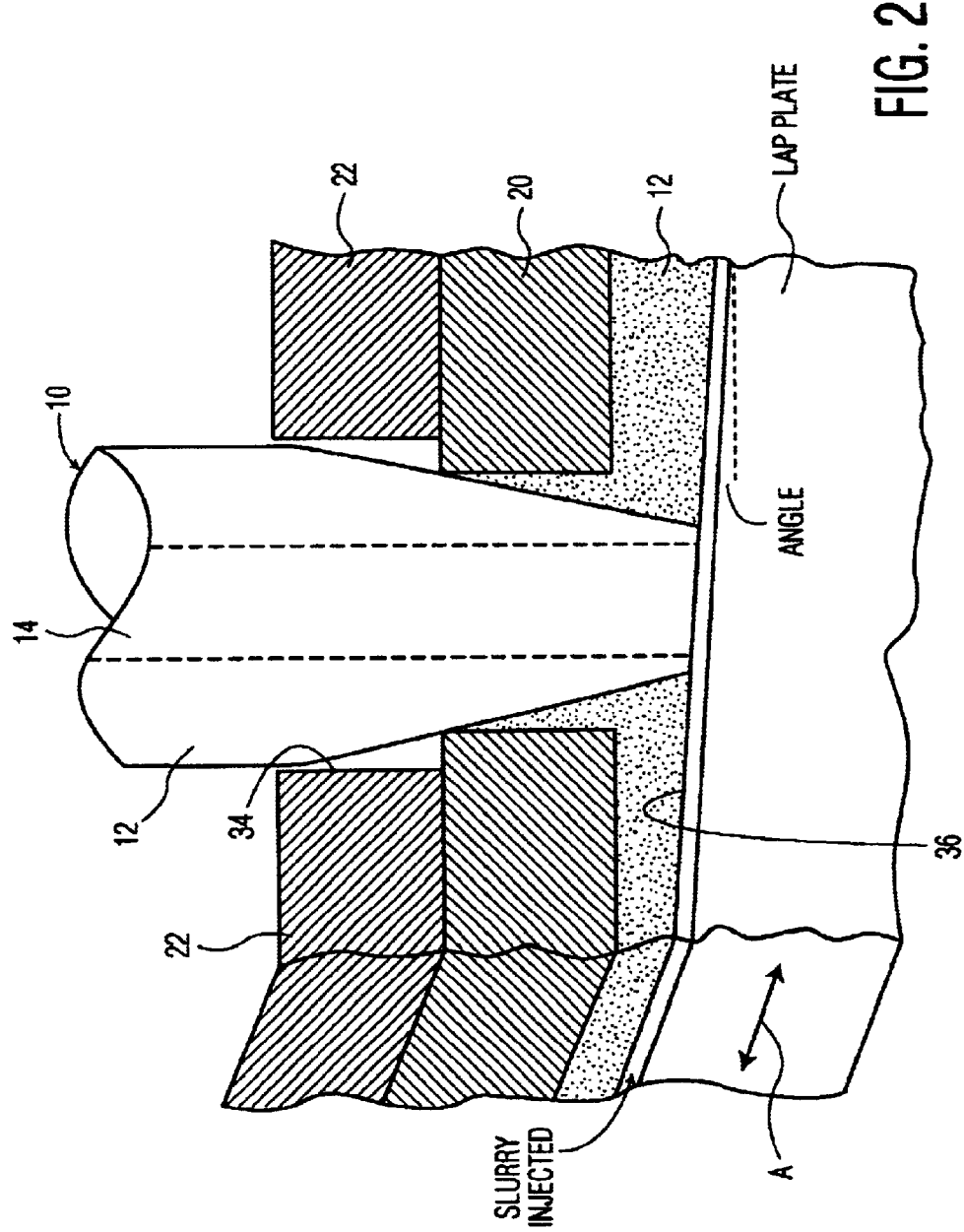
FIG. 2 is an exploded vertical section view taken along line 2—2 of FIG. 1 when the lap is grinding the array and before all the epoxy is removed.

Array 18 is preferably precisely positioned and held in a fixture secured to a frame, schematically shown at F in the figure, so that the optical axis of the array and each fiber is fixed in a predetermined direction. Lapping tool 30 is oriented with surface 36 facing mask 20. Tool 30 is advanced so that surfaces 36 engage all fiber tips or the epoxy covering all fiber tips in the respective rows with which respective surfaces 36 are aligned. Rails, fixtures, and other devices mounted on the frame (not shown) can be used in the usual manner to assure such alignment. Prior to or simultaneously with the start of the grinding action, a grinding slurry or lubricant is inserted between surfaces 36 and the surface to be ground, i.e. epoxy 21 of FIG. 2.

Grinding initiates by reciprocating tool 30 in a transverse direction shown by arrow A. Surface 36 then grinds epoxy 21 and the tip of fiber 10 at the precise angle, e.g. 8°. The slurry flow tends to lubricate surfaces and carry away debris. Grinding continues until at least the full core 14 is exposed through the epoxy ground surface or until the surface 36 engages or removes a portion or all of the front surface of mask 20. In either case, cladding 12 and core 14 are left with the desired angle relative to its optical axis as described above. Once lapping is completed tool 30 is withdrawn in direction T. If desired, a thin portion of the front mask 20 is removed to assure a planar surface in the mask spaces between the rows of fibers.

Tool 30 is then replaced with a polishing tool. Its configuration can be the same as tool 30 except instead of grinding material for plates 36, a polishing material would be used. Polishing each fiber forward surface results from advancing the polishing tool to engage the exposed fiber surfaces, injecting a polishing slurry and reciprocating the tool in the transverse direction until the desired polish finish forms on the fiber tips, after which the tool is withdrawn. Array 18 is now ready for further treatment or coupling to another connector or light source device (not shown).

It should be understood that all or a portion of the rows of fibers can be lapped simultaneously, as desired.

Figure 3:
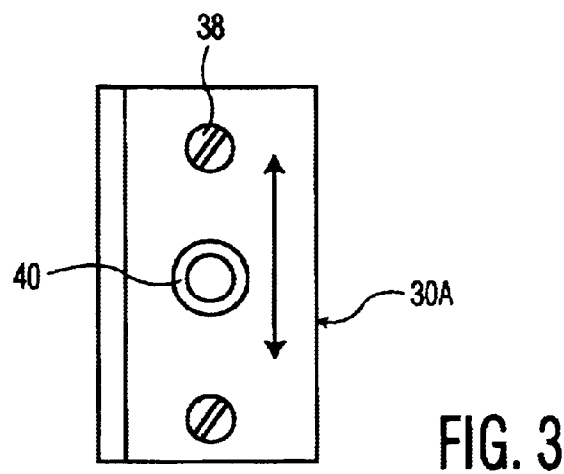
FIG. 3 is a top elevation of an alternate lap tool according to the principles of the present invention.
Figure 4:
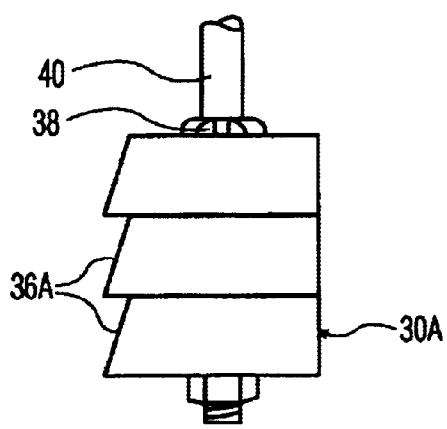
FIG. 4 is a side elevation of the tool of FIG. 3.

FIGS. 3 and 4 disclose an alternate lap 30A in which the plates are angled at faces 36A and no spacer plates are provided. Tool 30A then, when used in the present system, would angle the spaces between the fiber rows as well as the fiber rows themselves.

Figure 7:
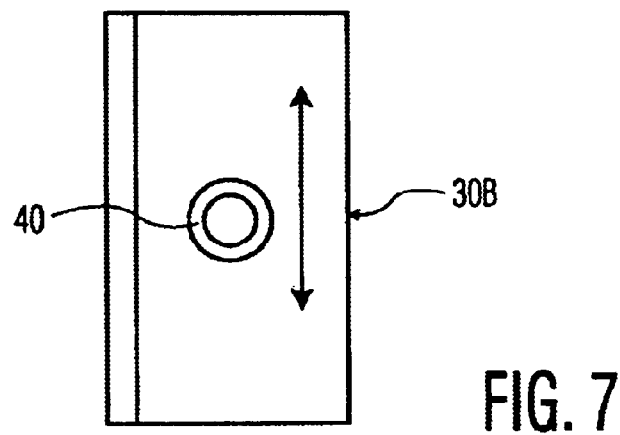
FIG. 7 is similar to FIG. 5 showing an alternate embodiment of the lap tool.
Figure 8:
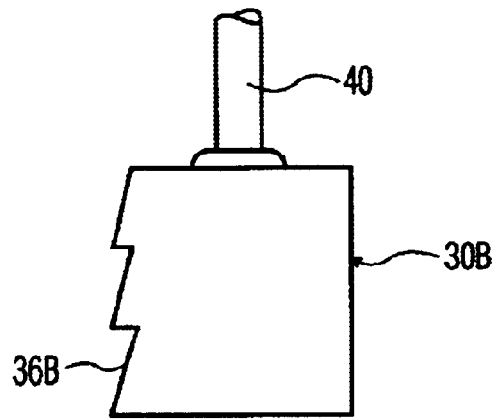
FIG. 8 is a side elevation of the tool of FIG. 7.

FIGS. 7 and 8 disclosed a further alternate tool 30B similar to that of FIGS. 3 and 4 except tool 30B is formed from a solid block instead of separate plates. Faces 36B are equivalent to faces 36A.

Figure 5:
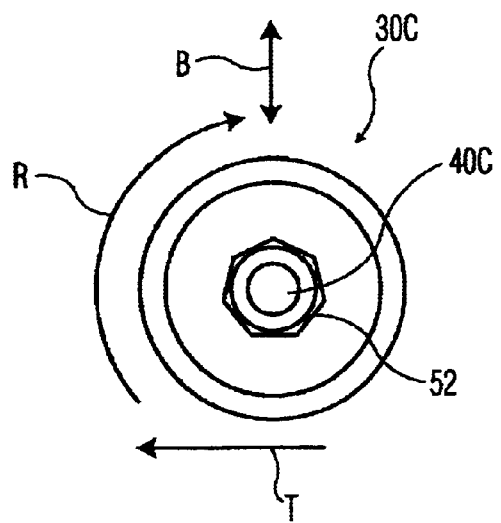
FIG. 5 is similar to FIG. 3 showing an alternate circular or disk lap tool.
Figure 6:
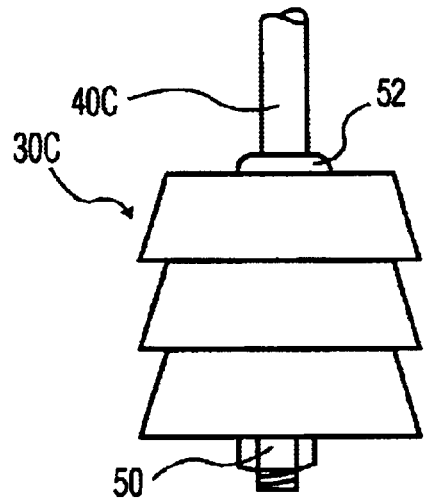
FIG. 6 is a side elevation of the tool of FIG. 5.

FIGS. 5 and 6 disclose yet a further alternate tool 30C that includes a series of stacked truncated conical plates held by locking bolts 50, 52. Unlike the above-mentioned tools and methods, tool 30C is translated along arrow to engage the array mask front surface and then rotated in direction R and translated in direction of arrow B to grind and/or polish as described. Shaft 40C provides the translation and rotation forces. Unlike the above-mentioned tools which provide the grinding/polishing action as a result of their translation motion, to 30C provides such action primarily from the rotation thereof even though more than one pass in both B directions may be employed. It is preferred that the rotational velocity of conical surfaces 36C of tool 30C be at least 2 times greater than the translational velocity of shaft 40C during grinding and polishing.

It will be understood that tool 30C can rotate in one direction during one translation pass and in the opposite or same direction during the return translational pass. Also, the rotational velocity of tool 30C can be controlled so that the lapping surface speed on the respective row is the same for one directional pass as in the opposite translational pass.

It will be understood that various modification and enhancements can be made to the herein disclosed exemplary embodiments without departing from the spirit and scope of the present invention. It will also be understood that the terms "row", "column", "forward", etc. are used for example purposes and should not be taken to limit equivalents or orientation thereof. Also, the movements of the lap should be taken as a relative movement between the lap and the housing or front mask.

What is claimed is:

1. A method of making an optical fiber array having a housing and a front mask at the forward end of the housing, the mask having initially a planar forward face and forming predetermined numbers of openings arranged in a predetermined pattern, said method comprising:

placing optical fibers within the housing and securing an optical fiber end within each opening, which fiber end includes an optical axis aligned generally normal to the initial plane of the mask forward face about the opening, and after the fiber end is secured in the opening, lapping the forward surface of each fiber so that the forward fiber surface is angled relative to the optical axis to prevent reflective optical signals from interfering with the data content of optical waves when the latter transmits through the fiber and simultaneously lapping a portion of the mask forward face about the opening so that the mask forward face portion about each said fiber end is angled relative the initial plane of the forward face and is co-planar with said forward fiber surface.

2. A method as set forth in claim 1, wherein the pattern of openings includes spaced rows and spaced columns of openings and the lapping step includes lapping the mask forward face between the rows of openings.

3. A method as set forth in claim 2, wherein the lapping step includes lapping the mask between the rows of openings such that the mask forward face portions between the rows of openings remains parallel to the initial plane of the mask forward face between the rows.

4. A method as set forth in claim 2, wherein the lapping step includes lapping the mask forward face between the rows of openings so that the forward face portions between the rows of openings becomes angled to the initial plane of the mask forward face between the rows.

5. A method as set forth in claim 1, further including applying a layer of epoxy to the mask forward face prior to said lapping thereof, and wherein said lapping step includes lapping away the epoxy from the mask forward face while lapping the forward surfaces of said fiber fibers, and wherein said lapping away is done at an angle to the initial plane of the mask forward face.

6. A method as set forth in claim 1, further including flushing a grinding or polishing compound liquid on the fiber forward surface during the lapping step.

7. A method as set forth in claim 1, wherein the lapping applied to the fiber forward surfaces includes a bi-directional translation motion with direction is parallel to the initial plane of the mask front face.

8. A product made by the method of claim 7.

9. A method as set forth in claim 1, wherein the lapping applied to the fiber forward surfaces includes a rotational motion about an axis that is parallel to the initial plane of the mask front face.

10. A product made by the method of claim 9.

11. A product made by the method of claim 1.

12. A system for manufacturing an optical fiber array that includes a housing, a front mask having a plurality of openings, and a plurality of optical fibers having fiber ends secured in the fiber openings, each fiber end having an optical axis extending in a direction generally normal to the plane of said front mask, the system comprising:

a lap for lapping the fiber ends while they are secured in the front mask said lap including lapping surfaces for lapping the fiber ends to form fiber end surfaces at an angle to prevent reflective optical waves from degrading data content of light waves when transmitted through said optical fibers.

13. A system as set forth in claim 12, wherein said plurality of openings and fiber ends are arranged in spaced rows and columns and said lap includes a plurality of lapping surfaces for lapping respective ones of said rows of fiber ends.

14. A system as set forth in claim 13, wherein said lapping surfaces are contiguous to each other in the direction normal to said rows.

15. A system as set forth in claim 14, wherein said lapping surfaces also laps the front mask forward face portions between the rows to the same angle as the fiber end surfaces.

16. A system as set forth in claim 13, wherein said lapping surfaces are spaced from each other in the direction normal to said rows.

17. A system as set forth in claim 16, wherein the lap includes spaced lapping surfaces for lapping the mask forward face between said rows so that the mask forward face portions between the rows are generally parallel to the initial front mask forward face.

18. A system as set forth in claim 13, wherein said lap comprises a solid block.

19. A system as set forth in claim 13, wherein
said lap comprises a series of stacked plates.
20. A system as set forth in claim 19, wherein
said series includes angled lapping surfaces.
21. A system as set forth in claim 19, wherein
said series includes first plates with angled lapping surfaces and second plates with lapping surfaces generally parallel to the mask front face.
22. A system as set forth in claim 21, wherein
first and second plates are at alternate positions within the series.
23. A system as set forth in claim 13, wherein
said system applies lapping to the rows of fiber ends by translating said lapping surfaces bi-directionally across said fiber ends.
24. A system as set forth in claim 13, wherein
said system applies lapping to the rows of fiber ends by rotating said lapping surfaces across said fiber ends.
25. A system as set forth in claim 24, wherein
said lap is translated in the row direction while said lapping surfaces rotate.
26. An optical fiber array comprising
a housing,
a unitary front mask secured to the front of said housing and having a number of openings arranged in a predetermined pattern and a planar back face,
a plurality of optical fibers extending normal through said back face and having ends secured in said openings,
each said end having an optical axis aligned in a normal direction relative to the portion of the mask front face surrounding the respective opening, and wherein
the front surface of each said fiber being angled relative to its respective optical axis, such angle being sufficient to substantially prevent reflective optical wave energy from interfering with the data content of optical signals through said fiber, and wherein
the forward face of said mask is lapped with the same angle as said fiber front surface relative to the initial plane of said front face.
27. An array according to claim 26, wherein
said predetermined pattern includes a number of rows and a number of columns.
28. An array according to claim 27, wherein
the pattern comprises an array of at least 10 rows×10 columns.

* * * * *